UNITED STATES PATENT OFFICE.

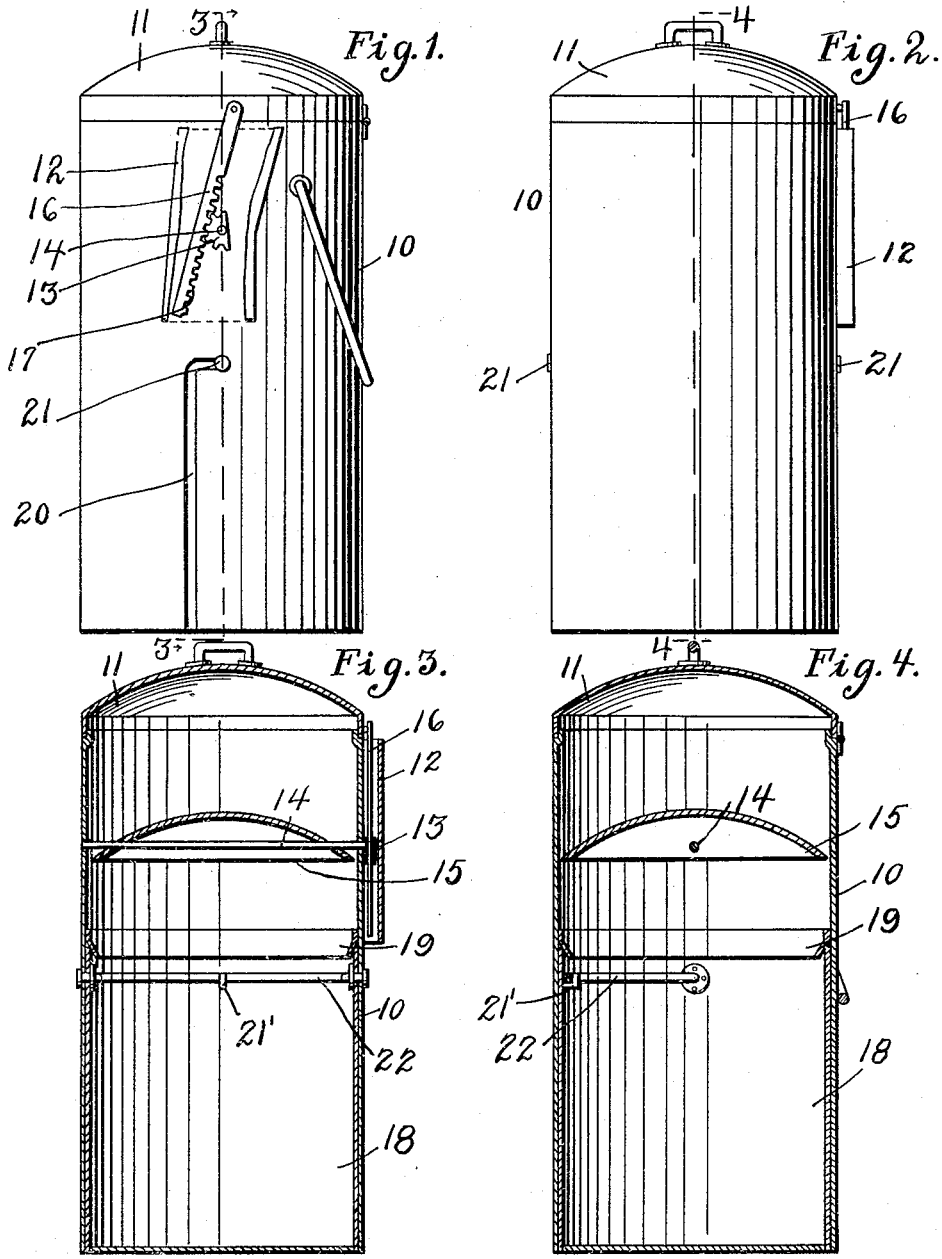

FREDERICK STANLEY, OF WALTHAM, MASSACHUSETTS.

GARBAGE-RECEPTACLE.

1,200,772.    Specification of Letters Patent.    Patented Oct. 10, 1916.

Application filed September 13, 1915. Serial No. 50,451.

*To all whom it may concern:*

Be it known that I, FREDERICK STANLEY, a subject of the King of Great Britain, residing at Waltham, in the county of Middlesex, State of Massachusetts, have invented certain new and useful Improvements in Garbage-Receptacles; and I do hereby declare the following to be a full, clear, and exact description of the invention, such as will enable others skilled in the art to which it appertains to make and use the same.

This invention relates to improvements in garbage receptacles.

The principal object of the invention is to provide a novel and efficient garbage receptacle which is odorless in its nature.

Another object is to provide a garbage receptacle in which is disposed means to completely shield the contents from view when the lid is open, said means being so constructed and arranged as to render the escape of odors from the receptacle difficult.

A further object is to provide a sectional receptacle of this character which can be quickly and easily separated for cleaning and emptying.

Other objects and advantages will be apparent from the following description when taken in connection with the accompanying drawing.

In the drawing: Figure 1 is a side elevation of my improved garbage receptacle partly broken away, Fig. 2 is a front elevation, Fig. 3 is a vertical section on the line 3—3 of Fig. 1, and Fig. 4 is a vertical section on the line 4—4 of Fig. 2.

Referring particularly to the accompanying drawing, 10 represents an open-ended cylindrical member formed of any suitable material, but preferably metal and having hinged to the upper end a cover 11. Mounted on one side of the upper end of the member 10 is a vertically disposed housing 12 in which there is disposed a segmental pinion 13 carried by one end of a shaft 14 which extends transversely through the said member. Carried by the shaft, within the member 10 is a metallic basin or bowl 15, the same being secured to the shaft so as to turn therewith. Pivotally connected to one side of the cover is the rod 16 the lower portion of which is provided with rack teeth 17 which engage with the teeth of the pinion 13. The rack toothed portions of the lever and the pinion are so arranged with respect to each other that when the cover 11 is raised into open position, the shaft 14 will be turned to present the bowl with its open side uppermost, and when the cover is in closed position the bowl will be inverted.

Disposed within the lower end of the member 10 is the garbage receptacle proper 18, the same extending upwardly to a point a slight distance below the bowl 15. Secured to the inner face of the member 10 and inclining downwardly and inwardly over the upper end of the receptacle 18 is a guard flange which insures the proper deposition of the garbage from the bowl into the receptacle. Extending longitudinally and vertically on diametrically opposite sides of the lower portion of the member 10 are the bayonet slots 20 which receive the laterally directed pins 21 carried by the upper portion of the receptacle.

In the operation of the device, the cover 11 is raised so that garbage can be deposited within the bowl. Upon closing the lid the bowl will be rotated into an inverted position so as to dump its contents into the receptacle 18. The bowl is of such size as to fit snugly within the member 10, thereby preventing the escape of odors from the receptacle.

By this construction and arrangement the contents of the garbage receptacle are never exposed to view, even when the lid is left in open position and hence are immune from the depredations of cats and dogs. When the garbage collector desires to empty the receptacle he simply rotates the member 10 and raises the same from the receptacle, which can then be conveniently lifted and dumped. A reverse operation replaces the member 10 on the receptacle.

Pivotally mounted on the pins 21 is a bail 22 which is disposed within the receptacle and rests on the hook 21' when in lowered position.

What is claimed is:

A garbage receiving device comprising a vertically disposed and open ended cylinder having longitudinally extending bayonet slots in the lower portion thereof, a hinged cover mounted on the upper end of this cylinder, a casing mounted on one side of the upper end of the cylinder, a rotatable casing mounted in the upper portion of the cylinder and provided with journals extending through the sides of the cylinder and carrying a pinion on one end thereof, a rack bar pivotally connected to the cover and engaging the pinion, a removable receptacle disposed within the lower portion of the cylinder and having laterally extending pins engaged in the bayonet slots and a depending circular flange carried by the inner wall of the cylinder and extending inwardly above the upper edge of the receptacle.

In testimony whereof, I affix my signature, in the presence of two witnesses.

FREDERICK STANLEY.

Witnesses:
D. E. PERKINS,
H. R. TURNER.